United States Patent [19]

Chao

[11] Patent Number: 5,110,839
[45] Date of Patent: May 5, 1992

[54] FOAMED CEMENTITIOUS COMPOSITIONS COMPRISING LOW WATER AND POLY(CARBOXYLIC)ACID STABILIZER

[75] Inventor: Yen-Yau H. Chao, Harleysville, Pa.

[73] Assignee: Rohm and Haas Company, Philadelphia, Pa.

[21] Appl. No.: 764,045

[22] Filed: Sep. 23, 1991

Related U.S. Application Data

[63] Continuation of Ser. No. 441,029, Mar. 22, 1989.

[51] Int. Cl.$^5$ ............................................. C08J 9/06
[52] U.S. Cl. ..................................... 521/83; 521/149
[58] Field of Search .......................................... 521/83

[56] References Cited

U.S. PATENT DOCUMENTS

| | | | |
|---|---|---|---|
| 4,166,749 | 9/1979 | Sterrett et al. | 521/83 |
| 4,229,223 | 10/1980 | Flake | 521/83 |
| 4,546,834 | 6/1986 | Widener et al. | 521/83 |
| 4,804,688 | 2/1989 | Vassileff | 521/83 |

Primary Examiner—Morton Foelak
Assistant Examiner—John M. Cooney, Jr.

[57] ABSTRACT

A foamed composition comprising about 100 parts by weight of a hydraulic substance, about 25 to less than about 70 parts by weight water and about 0.01 to about 10 parts by weight of a polymeric foam stabilizer having a weight average molecular weight from about 1,000 to about 20,000 and comprising a homopolymer or copolymer of $C_1$-$C_{12}$ alkyl carboxylic acids.

7 Claims, No Drawings

FOAMED CEMENTITIOUS COMPOSITIONS COMPRISING LOW WATER AND POLY(CARBOXYLIC)ACID STABILIZER

This application is a continuation of application Ser. No. 441,029, filed Nov. 22, 1989, now abandoned.

BACKGROUND OF THE INVENTION

There are a variety of compositions and processes to make precast and cast-in place lightweight cementitious articles. Some of these use lightweight fillers and aggregates to achieve lightweight. Some reduce their density by filling the cement body with tiny gas bubbles. There are many ways to make lightweight cement containing gas bubbles. One of the most common methods is aeration. Aeration can be done mechanically by foaming a freshly prepared cement slurry containing a foaming agent and a foam stabilizer. Another way to aerate cement is to add a pre-generated organic foam into a cement slurry.

To generate lightweight cement with good texture and mechanical performance by the aeration of conventional cement is generally difficult. This is due to the bubble collapse in the slow hardening process of the cement after hydration. Yet another cause for the collapse of cement bubbles is the incompatibility between the organic prefoam component and the inorganic cement slurry component. This latter collapse usually takes place immediately after the contact of the prefoam with the slurry.

U.S. Pat. Nos. 4,113,913; 4,441,944 and 4,559,263 describe foamed cementitious products using high levels of polymers to enhance mechanical strength. U.S Pat. No. 4,731,389 discloses the stabilization of cementitious foam by the interaction between a polyvinyl alcohol modifier and a salt additive such as sodium metaborate. U.S Pat. No. 3,867,159 describes the formation of lightweight concrete using low levels of water soluble polymeric cement binder with a proteinaceous foaming agent.

U.S Pat. No. 3,834,918 describes a raw batch for forming porous architectural structures using high water/cement ratios and water soluble foam stabilizers such hydroxpropyl methyl cellulose, polyvinyl alcohol, or salts of poly(acrylic acid) or poly(methacrylic acid).

U.S Pat. No. 4,473,406 describes unfoamed cementitious compositions having improved flow characteristics by incorporation of copolymers of ethylenically-unsaturated carboxylic acids and hydroxy alkyl esters.

U.S Pat. No. 4,792,360 describes unfoamed cement compositions comprising cement and polymers or copolymers of hydroxyalkyl (meth)acrylates.

U.S. Pat. No. 4,425,291 describes foamed alkali metal silicates using a surfactant and an aqueous natural latex dispersion for water-proofing.

U.S. Pat. No. 4,596,834 describes a foamed cementitious pipe insulation material using mineral acids as foam stabilizers.

British Patent No. 1,381,290 describes lightweight foamed magnesia cement modified with a polymer latex and using water-soluble silicone to stabilize the foam.

Japanese Kokai No. 63-248,782 discloses lightweight aerated cement products using hydroxycarboxylic acid, polyhydric alcohol, polycarboxylic acid salt, lignin sulfonic acid salt/polyol, methyl cellulose and gelatin.

The present invention provides improvements over the techniques used in the prior art to give foamed cementitious compositions which have improved foam stability, improved mechanical strength, improved water resistance and improved sound and thermal insulation.

SUMMARY OF THE INVENTION

The present invention relates to cellular or foamed compositions comprising about 100 parts by wt. of one or more hydraulic substances, about 25 to less than about 70 parts by weight water and about 0.02 to about 10 parts by wt. of a polymeric foam stabilizer having a weight average molecular weight from about 1,000 to about 20,000 and comprising a polycarboxylic acid homopolymer or salt thereof, wherein said compositions are prepared by uniformly mixing;
  a) a homogeneously foamed mixture comprising about 25 to less than about 70 parts by weight water and about 0.01 to about 5 parts by weight of said polymeric foam stabilizer, and
  b) a homogeneous slurry comprising about 25 to less than about 70 parts by weight water, about 100 parts by weight of said hydraulic substances, and about 0.01 to about 5 parts by weight of said polymeric foam stabilizer.

The compositions of this invention have improved foam stability and cure to form substrates which are lightweight and which have fine pore sizes, improved mechanical performance, improved insulative properties, fire resistance and low water pick-up.

The foamed composition can comprise from 0 to about 500 parts by weight optional ingredients such as foaming agents, polymeric cement binders, fillers, aggregates, fibers, pigments, thickeners, cement accelerators, cement retarders and water reducers.

The foamed compositions of this invention are useful as substrates in a variety of wall, floor and roof applications such as roof decks, lightweight shingles, tiles, slates, wall panels, exterior and interior flooring materials, soil stabilization and other geotechnical uses, roof panels, insulative composite boards, lightweight bricks, columns and insulative and flame-resistant coating materials.

DETAILED DESCRIPTION

In accordance with the present invention there is provided a foamed composition comprising from about 25 to less than about 70 parts by weight water, about 100 parts by weight hydraulic substance and about 0.02 to about 10 parts by weight of a polycarboxylic acid homopolymer or salt foam stabilizer having a weight average molecular from about 1,000 to about 20,000.

The polycarboxylic acid homopolymer is selected from the group consisting of poly(acrylic acid), poly(methacrylic acid), poly(itaconic acid), poly(citraconic acid), poly(crotonic acid), poly(maleic acid), poly(fumaric acid), poly(aconitic acid) and salts thereof. The alkali metal salts of the polycarboxylic acid homopolymers are preferred, and the most preferred homopolymers are the sodium or potassium salts of poly(meth) acrylic acid.

The foamed composition is prepared by uniformly mixing;
  a) a homogeneously foamed mixture comprising about 25 to less than about 70 parts by weight water and about 0.01 to about 5 parts by weight of said polymeric stabilizer, and
  b) a homogeneous slurry of about 25 to less than about 70 parts by weight water, about 100 parts by weight of at least one hydraulic substance, and about 0.01 to about 5 parts by weight of said polymeric foam stabilizer.

The weight of component a with component b is in the range of from about 0.002 to about 0.4 and preferably from about 0.01 to about 0.2.

The compositions are useful as substrates for floors, walls and roofs and have improved foam stability, improved mechanical strength, improved water resistance and improved sound and thermal insulative properties.

The foamed compositions of this invention are described herein based on about 100 parts by weight of hydraulic substances contained in said compositions. The term "hydraulic substance" as used herein means a substance which has the property of hardening through a hydration reaction when mixed with water. Some examples of suitable hydraulic substances for use in this invention include, Portland cement, aluminum cement, jet cement, Pozzolan cement, gypsum, plaster of paris and the like.

The compositions of this invention comprise about 0.01 to about 5 parts by weight of a polymeric foam stabilizer which functions to stabilize the fine bubbles or cells introduced into these hydraulic compositions. The polymeric foam stabilizers are homopolymers or copolymers of one or more ethylenically-unsaturated $C_1$-$C_{12}$ monomers containing carboxylic acid. The polymeric foam stabilizers of the present invention are water-soluble.

The polymeric foam stabilizers of this invention are prepared by solution polymerization. They are low molecular weight polymers having weight average in the range of from about 1,000 to about 20,000.

These following methods can be used to prepare the polymer useful in the present invention.

U.S Pat. No. 4,314,004 is directed to one such suitable copolymer synthesis method and the disclosure thereof is incorporated herein by reference. This method requires a specific concentration range of a polymerization initiator and a specific molar ratio range of the initiator concentration and the concentration of certain metal salts to obtain the desired low molecular weight polymers useful in the present invention. The preferred polymerization initiators are peroxide compounds such as ammonium persulfate, potassium persulfate, hydrogen peroxide and t-butyl hydroperoxide. The preferred concentration range of the initiator is between about 1 to about 20 weight percent based on the weight of monomers. The metal salts used to regulate molecular weight preferably include cuprous and cupric chloride or bromide, cupric sulfate, cupric acetate, ferrous and ferric chloride, ferrous sulfate and ferric and ferrous phosphate. The molar ratio of the polymerization initiator to the metal salt is preferably between about 40:1 to about 80:1. The polymers of (methy)acrylic acid useful in this invention are preferably prepared in water at a polymer concentration of about 40 to about 50 percent based on total weight of solution.

Another method useful to prepare these low molecular weight polymers is described in U.S Pat. No. 4,301,266, the disclosure thereof also being incorporated herein by reference. In this process isopropanol is used as the molecular weight regulator as well as the reaction solvent. The reaction solvent may also be an aqueous mixture of isopropanol containing at least 45 weight percent isopropanol. The polymerization initiator is a free radical initiator such as hydrogen peroxide, sodium persulfate, potassium persulfate, or benzoyl peroxide. The polmerization is carried out under pressure at a temperature of 120° to 200° C. The concentration of the copolymer in the solvent is preferably 25 to 45 percent based on the weight of the total solution. When polymerization is complete, the isopropanol is distilled from the reactor and the polymer may be neutralized with a base.

Still another method for preparing low molecular weight polymers useful in this invention is described in U.S. Pat. No. 3,646,099, the disclosure thereof also being incorporated herein by reference. This process is directed to the preparation of cyano-containing oligomers; however, it is also applicable for preparing low molecular weight polymers useful in the present invention. This process employs a bisulfite salt as the polymerization molecular weight regulator and the resulting polymers prepared thereby are sulfonate terminated. The preferred bisulfite salt is sodium bisulfite at a concentration of between 3 and 20 weight percent based on the weight of monomers. The free radical polymerization initiator is ammonium, sodium or potassium persulfate, hydrogen peroxide or t-butyl hydroperoxide. The concentration of the initiator is between about 0.2 to about 10 weight percent based on monomers. The polymerization temperature is preferably between 20° and 65° C. and the concentration of the polymers in the aqueous solvent is between 25 and 55 weight percent based on total solution weight.

The carboxylic acid-containing monomers useful in preparing the polymer foam stabilizer are the $C_1$-$C_{12}$ alpha, beta-monoethylenically unsaturated acids, dicarboxylic acids and partial esters of dicarboxylic acids. Some examples of suitable carboxylic acid-containing monomers include acrylic acid, methacrylic acid, itaconic acid, maleic acid, acryloxypropionic acid, fumaric acid, aconitic acid, crotonic acid, citraconic acid, methyl acid itaconate, butyl acid itaconate, ethyl acid fumarate, butyl acid fumarate acid maleate and the like. Preferably the carboxylic acid-containing monomers are selected from acrylic acid, methacrylic acid, acryloxypropionic acid and itaconic acid.

The foamed compositions of this invention can comprise from 0 to about 500 parts by weight optional ingredients selected from the group consisting of foaming agents, polymeric cement binders, fillers, aggregates, fibers, pigments, thickeners, cement accelerators, cement retarders and water reducers.

The term "foaming agent" as used herein means a substance that can introduce fine gas bubbles into the compositions of this invention. Typical foaming agents are anionic, nonionic or cationic surfactants and hydrolyzed proteins. The foaming agent can also be of the reactive type such as aluminum powder which generates hydrogen bubbles when mixed with wet cement. The foaming agent is preferably used at a level of 0 to about 10 parts by weight of foaming agent based on 100 parts by weight of hydraulic substance.

Polymer cement binders are the film-forming polymers typically used to modify cement. These cement binders are generally high molecular weight, low Tg polymers such as, for example, acrylic copolymers, styrene/butadiene copolymers, vinylidene chloride polymers, vinyl chloride/vinylidene chloride copolymers, vinyl acetate polymers, vinyl versatate polymers and the like. Suitable polymer cement binders for use in this invention are also described in U.S. Pat. No. 4,113,913 which is herein incorporated by reference.

Suitable fillers for this invention include substances such as sand, clay, fly ash, shale and the like. Suitable aggregates include substances like gravel, crushed rocks and the like. The fillers and aggregates can comprise from 0 to about 400 parts by weight of the compositions of this invention based on 100 parts by weight of hydraulic substances.

The foamed compositions of this invention can optionally contain fibers, such as, for example, glass fibers, ceramic fibers, glass/ceramic fibers, metallic wires, mineral fibers and natural and synthetic fibers such as cotton, wool, nylon, rayon, polyesters and the like.

The foamed compositions of this invention can optionally contain pigments such as titanium dioxide, carbon black, iron oxide and the like.

Suitable cement accelerators include, for example, $CaCl_2$, $Na_2CO_3$, NaOH, CaO, $Ca(OH)_2$ calcium formate and the like.

Suitable cement retarders include, for example, sodium citrate and sodium phosphate and the like.

The foamed compositions of the present invention can optionally contain from 0 to about 5 parts by weight of water reducers based on 100 parts by weight of hydraulic substances. As used herein, the term "water reducer" means a substance which is generally used in cement and concrete to improve the flow properties so that the compositions can be pumped or effectively poured. The water reducers can be used to make cementitious compositions with a reduced water content which still retain adequate flow properties. Examples of suitable water reducers for use in this invention include, for example, lignosulfonates, sodium naphthalene sulfonate formaldehyde condensates and the like.

The foamed compositions of this invention can be prepared by any of the known methods for making foamed cementitious compositions, such as, for example, aeration by mechanical mixing, heat expansion of freon, aeration by compressed gases and hydrogen generation through the reaction of aluminum powder with sodium hydroxide. Generally, the foamed compositions of this invention are prepared by the thorough mixing of a prefoam component with a cementitious slurry component. The prefoam component typically comprises a foamed mixture of water and the copolymeric foam stabilizers of this invention. The prefoam component preferably contains one or more foaming agents as described earlier. The cementitious slurry component typically comprises water and one or more hydraulic substances as described earlier. Preferably said cementitious slurry component additionally contains said copolymeric foam stabilizer at a level of about 0.01 parts by weight to less than about 30 parts by weight based on 100 parts by weight of hydraulic substances.

The foamed compositions of this invention can also be prepared by mixing a prefoam component comprising a foamed mixture of water and foaming agent(s) and a hydraulic slurry component comprising hydraulic substances and the copolymeric foam stabilizer of this invention. The foamed compositions can also be prepared by chemically or mechanically foaming a single mixture of all of the ingredients of the compositions.

The foamed compositions of this invention are useful in making lightweight substrates for a variety of applications. Conventional concrete usually weighs between about 120 to about 150 pounds per cubic feet, whereas the lightweight compositions of this invention are useful in making substrates having a density of about 10 to about 80 pounds per cubic feet. The low density (i.e. 10–20 lbs./ft$^3$) foamed substrates of this invention are useful as non-load-bearing insulative materials. The medium density (i.e. 20–50 lbs./ft$^3$) foamed substrates of the invention are useful as roof decks, shingles, coatings, and panels and boards for light load-bearing applications. The high density (i.e. 40–80 lbs./ft$^3$) foamed substrates of the invention are useful as shingles, panels, tiles, subfloors, piles and boards for load bearing applications. The foamed compositions are useful in various pre-cast and cast-in-place applications. The pre-cast boards, panels, shingles, tiles and other architectural structures can be formed by pouring the foamed compositions into a form or mold and allowing the foamed compositions to set. The foamed compositions can also be made into composite laminates with other plastic or inorganic structural members. The cast-in-place architectural structures can be formed by spraying, pumping or pouring of the foamed compositions on various horizontal or vertical surfaces and allowing the foamed compositions to cure.

The foamed compositions of this invention have improved foam stability and are resistance to foam collapse. The foamed compositions also give substrates which have improved physical properties such as water resistance, improved hardness, improved mechanical strength, improved thermal insulation and flame resistance.

The following examples are presented to demonstrate this invention. The examples are intended in an illustrative sense and not a limitative sense. All parts and percentages used in the examples are on a weight basis unless otherwise indicated.

EXAMPLES 1–8

Cellular cements in Example 1–8 were evaluated for their ease of foaming, foam stability, pore size and hardness development after one day cure at room temperature. The composition for component one (the formable aqueous mix) and component two (the cement slurry) used in Examples 1–8 are given the following table.

|  | Examples 1–8 (composition) | | | | | | *Comparative | |
| --- | --- | --- | --- | --- | --- | --- | --- | --- |
|  | 1 | 2 | 3* | 4* | 5 | 6 | 7* | 8* |
|  | | | | parts by weight | | | | |
| Component One | | | | | | | | |
| Acrysol LMW20N$^a$ (foam stabilizer) | 0 | 0.75 | 1.50 | 1.50 | 0 | 0 | 2.50 | 4.00 |
| Siponate DS-4$^b$ (foaming agent) | 0.25 | 0.13 | 0 | 0.08 | 0.13 | 0.13 | 0.25 | 0.38 |
| water | 25 | 25 | 25 | .25 | 25 | 25 | 25 | 25 |
| Component Two | | | | | | | | |
| Acrysol LMW20N | 0 | 2 | 0 | 0 | 2.5 | 4.0 | 0 | 0 |

-continued

| | Examples 1-8 (composition) | | | | | | *Comparative | |
|---|---|---|---|---|---|---|---|---|
| | 1 | 2 | 3* | 4* | 5 | 6 | 7* | 8* |
| | | | | parts by weight | | | | |
| (foam stabilizer) | | | | | | | | |
| Portland Cement | 400 | 400 | 400 | 400 | 400 | 400 | 400 | 400 |
| water | 172 | 170 | 172 | 172 | 170 | 168 | 172 | 172 |

[a]Acrysol LMW20N is an aqueous solution of the sodium salt of polyacrylic acid manufactured by Rohm amd Haas Company, Philadelphia, Pa.,
[b]Siponate DS-4 is an aqueous solution of sodium dodecylbenzene sulfonate at 23% total solids manufactured by Alcolac Ltd., Quebec, Canada.

Performances of the cellular cement in Examples 1-8 are given in the table below:

size is less homogeneous than those generated by mixing a prefoamed foam and a cement slurry.

| | Examples 1-8 (Performance at Density of 0.5-0.6 g/cu. cm.) | | | | | | | |
|---|---|---|---|---|---|---|---|---|
| | 1 | 2 | 3 | 4 | 5 | 6 | 7 | 8 |
| foamability of[a] Component one | good | good | un-foamable | bad | good | good | bad | un-foamable |
| foam collapse in[b] 24 hours (%) | total collapse | 0 | — | total collapse | 50 | 25 | total collapse | — |
| average pore diameter in mm | — | <0.5 | — | — | <1.0 | >0.5 | — | — |
| relative hardness developed after 1 day at room temperature (1-10) soft hard | — | 6-7 | — | — | 6-7 | 1 | — | — |

[a]Foamability is evaluated as follows:
good = generates light prefoam at density no greater than 0.04 g/cu. cm. after one minute whipping at speed 10.
bad = does not generate light prefoam at density less than 0.04 g/cu. cm. after three minutes whipping at speed 10.
[b]Foam collapse is calculated from the difference between the density of the final foam and that of the individual components before mixing.

Example 1 above shows that without foam stabilizer, the bubbles collapsed quite readily in the cellular cement. When the salt of polyacrylic acid (Acrysol LMW20N) was added in both component one and component two (Example 2), very stable foam with fine pore size and good one day hardness was achieved. Examples 3, 4, 7 and 8 show that the addition of the stabilizer-Acrysol LMW20N in just component one was insufficient; the system became either unfoamable (Examples 3 and 8) or excessive foam collapse took place (Examples 4 and 7). Some foam stability was achieved by adding the acid stabilizer in component two (Examples 5 and 6).

EXAMPLE 9

Cellular cement in Example 9 was made differently from that in Examples 1-8. Instead of adding a prefoamed foam into a cement slurry, all the foam ingredients in Example 9 were pre-mixed and resulting mixture was foamed. The composition for Example 9 is given in the table below:

| Example 9 (composition) | | | | |
|---|---|---|---|---|
| | parts by weight | | | |
| Portland Cement Type I | Triton X-405[a] | Acrysol LMW20N[b] | QP-4400[b] | water |
| 100 | 1.2 | 0.8 | 0.1 | 41 |

[a]Triton X-405 is a non-ionic surfactant manufactured by Rohn and Haas Company, Philadelphia, PA.
[b]QP-4400 is a hydroxyethyl cellulose thickener manufactured by Hercules Corp., DE.

Stable cellular cement at a density of 0.50 g/cu. cm. was made in Example 9. However, foaming of all the ingredients usually needs more energy and the bubble size is less homogeneous than those generated by mixing a prefoamed foam and a cement slurry.

EXAMPLES 10 AND 11

Cellular cements in Example 10 and 11 were prepared in the same way as that in Example 9. Furthermore, an acrylic cement modifier Rhoplex MC-76 (manufactured by Rohm and Haas) was present in both examples. Example 10 shows that, even the presence of cement modifier, stable foam (<5% foam collapse) at density=0.3 g/cu. cm. was achieved by the polyacrylic acid stabilizer. Upon removal of the polyacid stabilizer (Example 11), greater than 30% foam collapse took place.

| Examples 10 and 11 (composition) | | |
|---|---|---|
| | parts by weight | |
| | 10 | 11 |
| Rhoplex Mc-76[a] | 20 | 20 |
| LMW20N | 0.5 | 0 |
| Siponate DS-4 | 0.5 | 0.0 |
| water | 25 | 25 |
| Portland Cement Type I | 100 | 100 |

[a]Rhoplex MC-76 is an acrylic latex cement modifier with a total solids of 46%. It is manufactured by Rohm and Haas Company.

EXAMPLES 12, 13 AND 14

The salts of polymethacrylic acid, like their polyacrylic acid counterpart, are also good foam stabilizers for cement/concrete. Both Tamol 960 (polyMAA with MWt.=4-6,000) in Example 12 and AA/MAA copolymer with MWt.=3,000 in Example 13 give stable low density foams (density=0.5 g./cu. cm.) with fine pores (<30% pores have diameter equal or greater than 3/64 inch). However, a formulation based on a polyMAA (Tamol 850) with MWt. of 15,000 (Example 14) showed greater than 50% foam collapse at a density of 0.5 g./cu. cm.

| Examples 12, 13 and 14 (composition) | | | | |
| --- | --- | --- | --- | --- |
|  | M Wt. | 12 | 13 | 14 |
| Component One |  |  |  |  |
| Tamol 960 (polyMAA) | 4-6,000 | 0.8 | 0 | 0 |
| AA/MAA copolymer | 3,000 | 0 | 0.7 | 0 |
| Tamol 850 (poly MAA) | 15,000 | 0 | 0 | 0.6 |
| Siponate DS-4 |  | 0.1 | 0.09 | 0.07 |
| Water |  | 20.0 | 18.2 | 14.4 |
| Component Two |  |  |  |  |
| Tamol 960 |  | 1.8 | 0 | 0 |
| AA/MAA copolymer above |  | 0 | 1.5 | 0 |
| Tamol 850 |  | 0 | 0 | 1.8 |
| Portland Cement Type I |  | 300 | 300 | 300 |
| Water |  | 126 | 126 | 126 |

EXAMPLES 15 AND 16

Solid grade polymer containing acid functional groups can also be used as foam stabilizer in this invention and it can be blended with the cement powder in Component two. Low density foam (density=0.5 g./cu. cm.) derived from cement formulation containing solid salt of polyacrylic acid Acrysol LMW20ND (Example 15) showed less than 5% foam collapse. However, as the Acrysol LMW20ND was removed from the cement formulation (Example 16) the foam showed greater than 50% collapse.

| Examples 15 and 16 (composition) | | |
| --- | --- | --- |
|  | 15 | 16 |
| Component One |  |  |
| Acrysol LMW20N (Na salt of poly AA) | 0.3 | 0.3 |
| Siponate DS-4 | 0.05 | 0.05 |
| Water | 9.7 | 9.7 |
| Component Two |  |  |
| Acrysol LMW20ND (solid version of Acrysol LMW20N) | 0.5 | 0 |
| Portland Cement Type I | 200 | 200 |
| Water | 84 | 84 |

What is claimed is:

1. A foamed composition consisting essentially of from about 25 to less than about 70 parts by weight water, about 100 parts by weight hydraulic substance and about 0.01 to about 10 parts by weight of a polymeric foam stabilizer having a weight average molecular weight from about 1,000 to about 20,000 and comprising a homopolymer or copolymer of C1-C12 ethylenically unsaturated carboxylic acid monomers and salts thereof; wherein said composition is prepared by uniformly mixing: a) a homogeneously foamed mixture comprising about 25 to less than about 70 parts by weight water and from about 0.01 to about 5 parts by weight of said polymeric stabilizer, and b) a homogeneous slurry comprising about 25 to less than about 70 parts by weight water, about 100 parts by weight of said hydraulic substance, and from about 0.01 to about 5 parts by weight of said polymeric foam stabilizer.

2. The composition of claim 1 comprising 0 to about 5 parts by weight of water reducers, 0 to about 10 parts by weight of foaming agents, 0 to about 400 parts by weight of fillers, and 0 to about 400 parts by weight of aggregates.

3. The composition of claim 1 wherein the weight of component a to component b is in the range of from about 0.002 to about 0.4.

4. The composition of claim 1 wherein said hydraulic substance is cement or gypsum.

5. The floor substrate comprising the composition of claim 1.

6. The roof substrate comprising the composition of claim 1.

7. The wall substrate comprising the composition of claim 1.

* * * * *